United States Patent
Houston

[15] 3,643,442
[45] Feb. 22, 1972

[54] AGRICULTURE IRRIGATING METHOD

[72] Inventor: Richard K. Houston, Kansas City, Mo.

[73] Assignee: Agrecology, Incorporated, Kansas City, Mo.

[22] Filed: Feb. 25, 1970

[21] Appl. No.: 13,975

Related U.S. Application Data

[63] Continuation-in-part of Ser. No. 697,980, Jan. 15, 1968, abandoned.

[52] U.S. Cl. ..........................................61/12, 111/1, 239/177
[51] Int. Cl. .........................................E02b 13/00, B05b 3/00
[58] Field of Search .....................61/12; 239/159, 177–178, 239/212–213; 222/176–178; 111/1; 47/9, 1

[56] References Cited

UNITED STATES PATENTS

| | | | |
|---|---|---|---|
| 2,949,871 | 8/1960 | Finn | 111/1 |
| 3,352,493 | 11/1967 | Curtis | 239/177 |
| 2,756,544 | 7/1956 | Rosgen | 47/1 X |
| 2,892,593 | 6/1959 | Smeltzer | 239/177 |
| 3,353,751 | 11/1967 | Dowd | 239/177 |
| 3,493,176 | 2/1970 | Kinkead | 239/177 X |

*Primary Examiner*—Robert E. Bagwill
*Attorney*—Don M. Bradley

[57] ABSTRACT

A method of irrigating a field for maximum efficiency wherein the water is flowed onto the field from above and from mobile irrigation apparatus at a flow rate far exceeding the permeability factor of the soil. Slots are formed in the soil surface to receive the inherent water runoff to conduct the water into the subsurface soil regions. The water may be discharged directly into the slots by aligning hoses and the slots and the latter are preferably mulched to minimize evaporation. Elongated irrigation manifolds are moved through successive arcs swung about pivot points at alternate ends of the manifold to maximize length of crop rows and the efficiency of movement of the apparatus in the irrigation operation.

5 Claims, 4 Drawing Figures

INVENTOR.
RICHARD K. HOUSTON
BY
Don M. Bradley
ATTORNEY

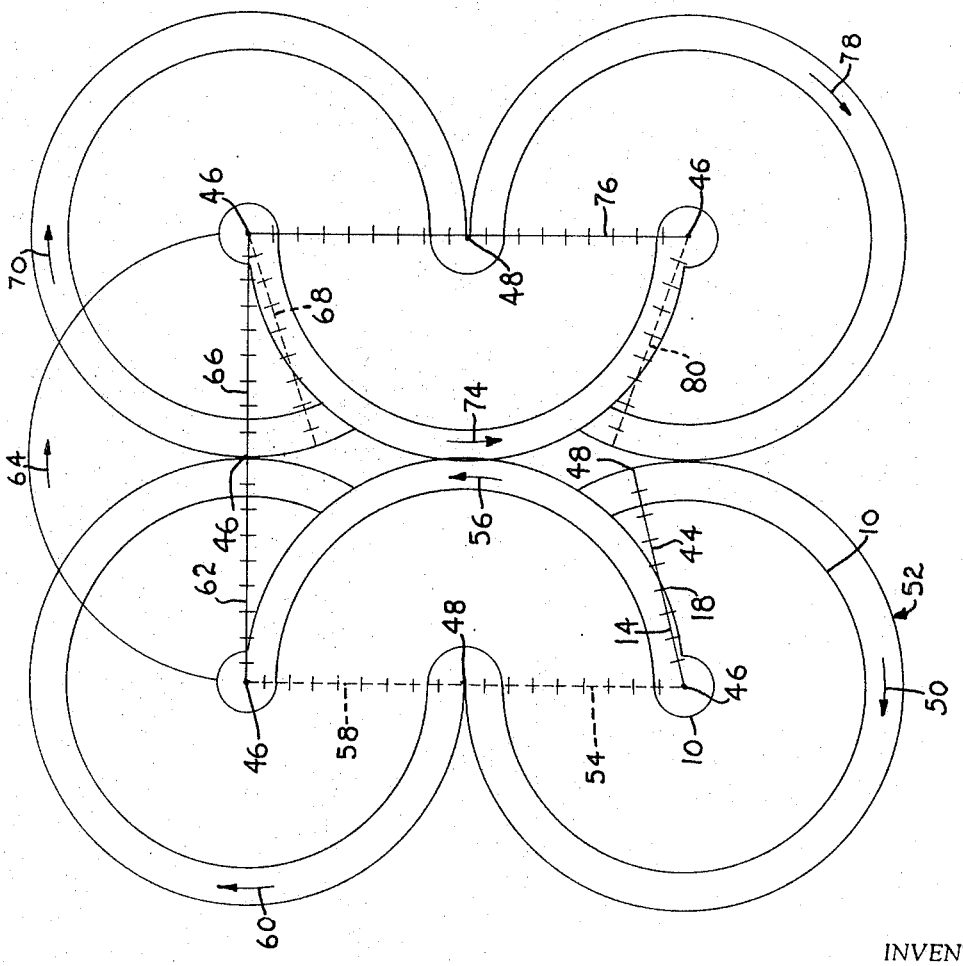

AGRICULTURE IRRIGATING METHOD

This is a continuation-in-part of my copending application Ser. No. 697,980, filed Jan. 15, 1968, and now abandoned, entitled "Method of Irrigation."

This invention relates to agricultural operations, and more particularly, to a method of irrigating farm land.

A serious problem with conventional irrigation practices has been the high loss of irrigation water through evaporation. These losses are especially acute in overhead irrigation systems where the water is sprayed into the air for gravitation onto the crop and the surface of the crop supporting soil. Areas subject to high winds are particularly susceptible to serious losses of this type.

Application of the irrigation water to a relatively wide soil intake area produces a muddy condition through which the irrigation apparatus must move. This condition increases the power and equipment costs of the operation and also results in inconvenient and often damaging ruts in the soil.

Spray irrigation has the advantage over operations where the irrigation water is periodically flooded over the field in that it is usually unnecessary that the field be leveled to irrigate. Field leveling operations are extremely costly. However, the water must usually be discharged from the nozzles at a pressure of about eighty p.s.i. in order for the sprays to adequately cover the area to be irrigated. Obviously, the equipment and power costs for delivering water to the spray nozzles at pressures of this magnitude are relatively great.

Accordingly, it is a primary object of the present invention to provide a method of irrigating agricultural lands which reduces the loss to the irrigation water through evaporation before the water reaches the soil and loss due to evaporation from the soil surface to an absolute minimum, while insuring that the crop supporting soil is provided with adequate moisture.

Another important object of the present invention is to provide a method for achieving the foregoing object while permitting the use of overhead, mobile water-applying equipment.

Yet another important object of this invention is to provide a method for applying irrigation water to a field whereby the power requirements are kept to a minimum and the irrigating apparatus need not move through mud.

Another object of the invention is to provide a method of irrigating which particularly enhances the application of fertilizers to the soil with the irrigation water.

These and other very important objects of the present invention will be further explained or will be apparent from the specification, claims and drawings.

In the drawings:

FIG. 3 is a diagrammatic illustration of the path of movement of irrigation apparatus pursuant to one feature of the instant invention.

Modern irrigation methods have resulted in the development of apparatus for applying water to an agricultural field capable of minimizing the labor costs involved. Such apparatus conventionally comprise elongated relatively rigid water manifolds or conduits which are coupled with a source of irrigation water and which are caused to traverse the field while distributing the water more or less uniformly over the surface.

The manifolds are supported above the surface of the soil on tracks or mobile supports and these are often self-propelled, either by motors operated by water flow or by other prime mover means. The water is sprayed into the air from nozzles situated at spaced intervals along the length of the manifold. One conventional form of irrigation apparatus is moved generally in a straight line across the surface of the field. Another form of apparatus traverses a circular path of travel and the manifold is pivoted adjacent one end thereof at the center of the circle. Obviously, the speeds of the various mobile units spaced longitudinally along the manifold are correlated to produce the circular movement and the rates of flow of the water through the nozzles are also governed so that each nozzle sprays an appropriate amount of water calculated to achieve substantially uniform moisture application to the surface being covered.

A substantial loss of efficiency in the irrigation operation occurs in the evaporation of the water which must be sprayed into the air. In addition, the speed at which the equipment may move is necessarily governed by the rate at which the soil is capable of absorbing the water for movement through the soil to the regions where the water is available to the growing coops. This ability of a particular soil to receive water into the soil without substantial runoff is termed the permeability factor of the soil. Manifestly, the permeability factor varies for different soils but can be determined for any particular soil.

Figure 1:
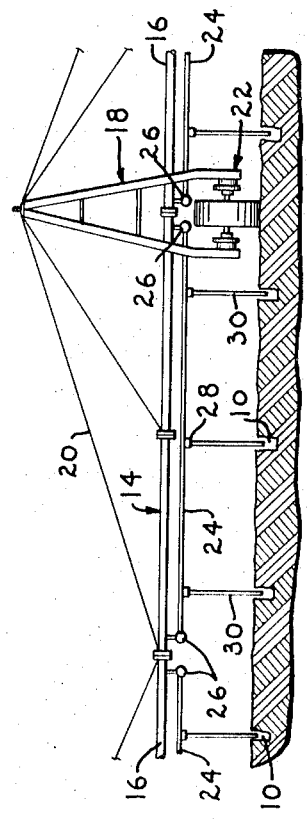
FIG. 1 is a fragmentary, rear elevational view of apparatus suitable for irrigating pursuant to the method of this invention, the especially configured soil being shown in cross section.
Figure 2:
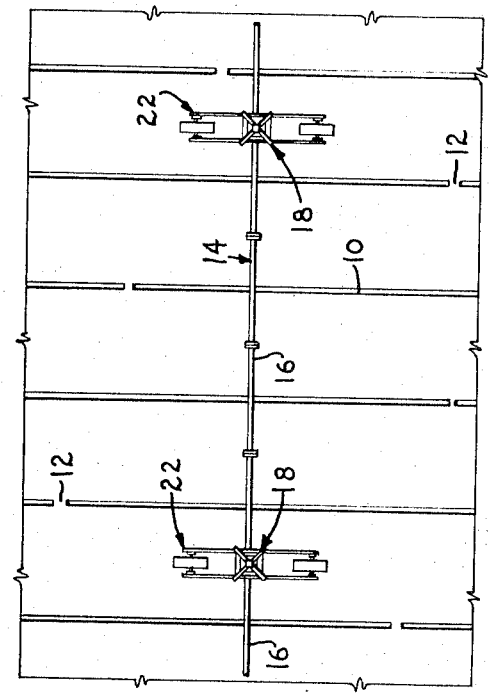
FIG. 2 is a fragmentary, top plan view on a reduced scale of the apparatus and field of FIG. 1.

The method of this invention departs from conventional irrigation practices. As an initial step in this method, the surface of the soil is prepared by forming in the soil a plurality of relatively closely spaced slots 10. These slots usually extend generally parallel with one another as illustrated in FIGS. 1 and 2. The slots 10 are open at the top and extend vertically into the soil. The optimum size of each slot for a particular soil may be determined empirically but it has been determined that slots approximately 4 inches in width and 8 inches in depth provide good results for a wide range of soil conditions and availability of residue to adequately fill the slot. Further, it is contemplated that the slots may be approximately 60 inches apart, but this spacing will also depend somewhat upon soil and climate conditions as well as the nature of the crop to be produced.

In flat soils or those having a controlled grade, the slots may continue uninterrupted throughout the entire length of a field. However, many fields are not level and it may be desirable to provide interruptions 12 (FIG. 2) at spaced intervals longitudinally along the slot to prevent maldistribution of the water from uncontrolled flow in the slots.

The slots may be formed by any of a number of available means which will be apparent to those skilled in this art. For example, there are commercially available slot cutters or ditch digging machinery which could be utilized for this purpose.

A quantity of reinforcing material may then be installed in each slot prior to the application of the irrigation water to the field. The reinforcement material is intended to preserve the function of the slots. It maintains the integrity of the slots and prevents crumbing of the sides which would close the slots at the surface. The material must be of a type which will permit the perculation of water downwardly therethrough and it also should prevent substantial evaporation of moisture from the slots.

To this end, the reinforcement material may comprise any of a number of suitable mulches such as hay, straw or the like. The mulch material which is most likely to be readily available in most farming operations is the crop residue which remains following harvesting of the crop. This residue may be installed into the slots whenever necessary to insure that the slots remain essentially open at the top for admitting water into the slot. Such types of organic material have a further advantage in that the decay activities greatly increase the permeability of the soil sides of the slots thus further increasing the intake capacity of each slot.

Another important step in the method of this invention is the application of water to the field at a rate which substantially exceeds the permeability factor of the particular soil subjected to the irrigation process. FIGS. 1 and 2 illustrate one form of apparatus which is suitable for applying water in the manner embraced in this method. The elongated relatively rigid water manifold 14 comprises a plurality of axially aligned sections 16 interconnected at their abutting ends to permit continuous flow of water throughout the manifold. Obviously, the manifold 14 is provided with means (not shown) for communicating with a source of irrigation water. It is conventional that fields to be irrigated may be provided with an underground piping system having a plurality of outlets to which the mobile irrigation apparatus may be coupled for obtaining the water to be applied by the apparatus. Where no underground piping system is available, hoses or auxiliary pipes may be relied upon for providing this water.

The manifold 14 is supported at spaced intervals by tower structures 18 from which emanate the supporting cables 20.

Each tower structure 18 is carried on a wheel assembly 22 and sufficient of the assemblies 22 are powered to provide the movement of the apparatus across the irrigation field.

Auxiliary conduits 24 extend generally parallel with manifold 14 and communicate at either end of the conduits 24 with the manifold. The conduits 24 are of predetermined lengths and include valve means 26 for controlling the flow rate of water admitted to a particular conduit 24. Manifestly, these flow rates are chosen in accordance with the relative position of each particular conduit so that the quantities of water applied to the field may be uniform irrespective of the path of movement of the apparatus.

Outlets 28 carried by the conduits 24 are spaced apart equal to the spacing of the slots 10 and are positioned immediately above their corresponding slots. An elongated, generally flexible conduit or hose 30 is carried by each outlet 28 and extends downwardly therefrom for discharging water directly into the corresponding slot. Alignment may be achieved by aligning the slotting operation with the corresponding wheel marks of the mobile towers.

It is an important feature of this invention that the irrigation water be protected at all times insofar as is possible from the adverse affects of evaporation. This is achieved not only by eliminating the nozzles which spray the water out into the air, but also by applying the water at a rate of flow which insures that the major portion of the water is conducted down into the soil regions where it is protected from evaporation and is available to the growing crop. This preferably achieved by flowing the water directly into the slots to the exclusion of application of water onto the upper soil surface. It will be recognized that this may also be achieved by flowing the water onto the soil surface at a rate which insures that most of the water is caused to run off the surface and into the adjacent slots. This step is in distinct contrast to ordinary irrigation methods which rely entirely on permeation of the water from the soil surface and wherein the flow rates are calculated to be at or below the soil permeability factor in order to avoid loss from water runoff.

The method of this invention recognizes that a substantial portion of the water which permeates the upper soil surface is subsequently lost through evaporation as this surface dries. Many soil conditions are such that an amount of water equivalent to about 1 inch in rainfall can be received into the slots of the type, size and spacing contemplated in this invention. At a rate five times the permeability factor of the soil surface, then 20 percent of the moisture or 0.20 inch will soak into the surface. Since 0.20 inch of moisture is about the amount held by one inch of soil, then this moisture would not penetrate sufficiently to contact the water moving laterally from the inside of the slot. Thus, substantial capillary contact with the major moisture body is avoided and this, of course, greatly reduces evaporation. Any further amount of soaking from the top due to slower application wastes more water from the standpoint of evaporation and raises considerably the likelihood of capillary contact between the main body of moisture and the soil surface. The maximum rate is governed by the ability fro the slots to receive the runoff water and this ability varies according to slot size and spacing, soil conditions and the type and quantity of mulch material contained within the slot.

Figure 4:
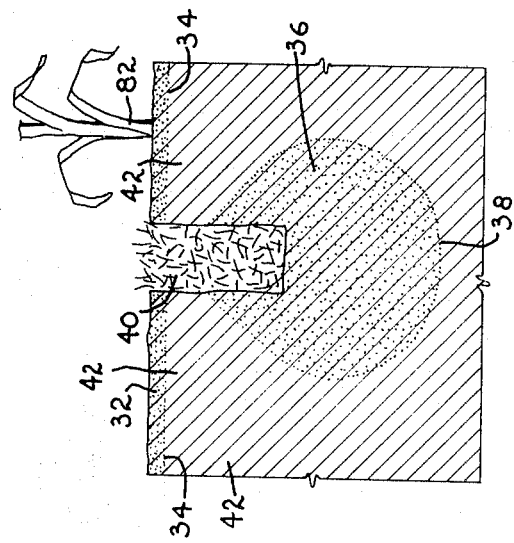
FIG. 4 is an enlarged, fragmentary partially diagrammatic vertical cross-sectional view through the soil showing the slot and the approximate wetting zones from water applied to the field by the method of this invention.

The foregoing can be diagrammatically illustrated by referring to FIG. 4 of the drawings. The layer of the soil which is wetted as a result of application of water on the soil surface is designated by the reference numeral 32. This region 32 has a lowermost boundary termed the vertically proceeding wetting front and designated by the reference numeral 34. The water received in the slot soaks into the soil to wet a region generally designated 36 and the peripheral boundary of region 36 is designated by the reference numeral 38. This boundary may be termed the lateral wetting front. When water falls on the soil surface, some permeation into the soil at the surface cannot reasonably be avoided. Most of this water is eventually lost to evaporation. On the other hand, most of the water which enters slot 10 percolates immediately downwardly through the mulch material 40 where it is substantially protected from evaporation. This water in region 36 is separated from the evaporation prone water in zone 32 by a zone of dry soil 42 between the vertical wetting front 34 and the lateral wetting front 38.

It has been discovered that, under most conditions, the highly desirable maintenance of a dry zone between the lateral and vertical wetting fronts respectively can be maintained when the irrigation water is applied to the soil surface at a rate equaling or exceeding about five times the permeability factor of the soil. This insures the maximization of movement of the irrigation water into the slot and thence into the subterranean region 36 where the water is available to the roots of the growing crop and where it is protected from evaporation.

It will now be recognized that applicant's novel method for maximizing the usefulness of irrigation water can either be achieved by the step of dropping the water directly into the slot or by flowing the water at a rate sufficient to insure that the zone 32 is kept to a minimum. Either step is adapted for use of the labor saving mobile irrigation equipment yet eliminates the extremely wasteful effects from spraying the irrigation water into the atmosphere.

When the water is dropped directly into the slots the wheel assemblies 22 are not required to move through a muddy surface. Power requirements are thereby reduced and the soil is not subjected to damaging puddling action. Since water can flow out of the hoses at low pressure, the excessively high pressures required for spray pattern coverage are also eliminated at substantial savings in the cost of irrigation.

The slots of the present method provide a water-catching capacity which is in addition to the ability of the water to permeate into the soil. This allows extremely high application rates which are limited only by the necessity to avoid slot overflow. With present methods, there is little immediate water intake; therefore the spray application rate is limited to the ability of the water to permeate into the soil. In most cases, this allows substantially twice the acreage to be irrigated with generally comparable equipment modified essentially only by use of a larger diameter water manifold.

A further feature of the novel method embraced by this invention resides in a unique program for movement of the irrigation equipment over the field. This program maximizes the amount of the field which is traversed by the equipment without time consuming and expensive movements of the elongated manifold longitudinally of the manifold from one water source to another. These longitudinal movements ordinarily require that the wheel assemblies 22 be rotated approximately 90° so that a towing vehicle can translate the manifold and associated equipment to a new location whereupon the arcuate movement is resumed. Arcuate movement is, of course, unnecessary in installations which permit rectilinear movement of the apparatus across a field. Often, however, the location or locations of the water source dictate that the irrigation apparatus be moved in a circular path proceeding from a fixed point dictated by the location of the water source.

Referring now to FIG. 3 of the drawings, a typical sequence of movements pursuant to applicant's program is diagrammatically illustrated. The general location of the manifold 14 near the start of the program is designated by the reference numeral 44. One end 46 of the manifold is held in a substantially fixed position while the other end 48 thereof is rotated in the direction of the arrow 50. Line 52 represents the boundary of the arcuate path described by the manifold as it is swung in a horizontal plane over the field surface. The towers 18 are diagrammatically illustrated by crossmarks and it is contemplated that the slots 10 (only the slots corresponding to one hose being illustrated in FIG. 3) would generally align with the corresponding hoses.

Manifold 14 is swung in a clockwise direction about end 46 until it reaches a position generally illustrated by the reference numeral 54. At this position, end 48 is held stationary as the point of pivot and end 46 is moved in the direction of the arrow 56 until the manifold reaches the position 58.

Here again, the point of pivotal movement of manifold 14 is reversed and end 46 is again held stationary while the end 48 is moved in the direction of arrow 60 until the manifold reaches the boundary irrigated during the immediately preceding arcuate swinging movement of manifold 14.

The direction of pivoting of manifold 14 is then reversed to bring the manifold into the position illustrated by the numeral 62 whereupon end 46 is swung in the direction designated by the arrow 64 until it reaches the position illustrated by the numeral 66. It should be noted that during all or a portion of this path of travel, the supply of water to the manifold can be shut off to effect a dry pivoting swing of the manifold.

The manifold is thereupon swung about the point of pivot at end 46 until it achieves a position illustrated by dotted lines and designated by the reference numeral 68. This arcuate swinging segment may also be accomplished with no water distributed from the manifold. After position 68 is assumed, the manifold is swung in the direction of arrow 70 until it reaches position 72. Here again, the manifold is swung about end 48 in the direction of arrow 74 until the manifold reaches position 76. The direction of movement is reversed at this position and proceeds in the direction of arrow 78 until the manifold arrives at the boundary of the preceding swing which position is generally designated by the numeral 80.

It will now be apparent to those skilled in the art that the apparatus might be translated longitudinally from this position to a new position on the field to the right of position 80 in FIG. 3 whereupon a subsequent series of arcuate swings may be instituted for continuing the irrigation process. Obviously, any of the successive steps previously described could be interchanged or combined in a variety of ways to accomplish maximum economy of movement by utilizing the unique, reverse pivot movement of the mobile irrigation apparatus over the field.

It will be recognized that the foregoing sequence minimizes translational movement of the apparatus while covering a maximum area from a plurality of predetermined pivot points. These pivot points may be chosen to correspond with outlets for subterranean pipe systems. When it is recognized that many manifolds 14 are conventionally of approximately one-fourth mile in length, it will also be appreciated that the slots 10 and therefore the rows of crop in the soil between the slots are of a length which clearly decreases the total time turning around at the ends of the rows.

The crop to be grown on fields irrigated with applicant's novel method is diagrammatically represented in FIG. 4 by the single plant designated 82. The crop is planted in the soil intermediate the slots and can be planted with commercially available tools which provide a slicing action through the soil surface. The surface of the soil may be inclined toward the slots to further maximize runoff of the irrigation water into the slots. Such inclinations can also help a trailing hose to align itself with the corresponding slot.

While application of fertilizers with irrigation water is not new, this method is particularly well suited for this purpose. The water is conducted quickly down into the soil regions by the slot so that the fertilizer is not lost through volatilization. Fertilizers such as phosphorus which tend to be immobile once in the soil are placed in positions where they are readily available for effective use by the plant. Not to be overlooked is the contribution which this method of irrigating makes toward maximum utilization of available rainfall in the irrigated region. Heretofore, with conventional methods, irrigating has sharply conflicted with the available rainfall. Should the rainfall occur shortly following irrigation, much of the rainfall was normally lost from runoff as a result of the presaturation of the soil by the irrigation water.

The large immediate water holding capacity of the slots plus the high permeability of the sides of the mulched slots prevents the runoff from such rainfalls even though they should occur relatively soon after the field is irrigated. This irrigating method works in harmony with rainfall rather than in conflict with it.

Although the foregoing explanation of the method of this invention has emphasized the application of the water through hoses directly aligned with each slot, it should be kept in mind that the main advantages of the invention can also be achieved by flowing the water onto the field from mobile equipment at a rate which insures an optimum quality of water entering the mulched slots. Even equipment moving in a direction not aligned with the slots could accomplish these objectives when the described flow rate is utilized.

Having thus described the invention, what is claimed as new and desired to be secured by Letters Patent is:

1. A method for irrigating a field used for growing crops and having a determinable factor of water permeability, said method comprising the steps of:
   forming a series of elongated, spaced apart, vertically extending slots in the surface of the field;
   releasing a flow of irrigation water onto the slotted field surface from a source above the latter;
   progressively moving the source across the field at a speed correlated with the rate of flow of said water onto the field so that the water flows onto the field at a rate of at least approximately five times the permeability factor of the soil, whereby a major portion of said irrigation water is concentrated by gravity into the slots.

2. The invention of claim 1, wherein said water is released directly into the slots from sources aligned with the slots.

3. The invention of claim 1, wherein is included the step of placing a reinforcement material in the slots prior to flowing the water therein, said material having the characteristic of conducting water downwardly therethrough and protecting the water in the slots from evaporation while exerting a reinforcing force against the sides of said slots to minimize crumbling of soil into the slots.

4. A method for irrigating a field used for growing crops and having a determinable factor of water permeability, said method comprising the steps of:
   forming a series of elongated, spaced apart, vertically extending, generally parallel slots in the surface of the soil;
   moving an elongated water source over said surface;
   releasing a plurality of streams of water from the source and directly into the slots, there being a stream for each slot respectively,
   said step of moving the water source being carried out simultaneously with the step of releasing said streams, and proceeding progressively across the field at a rate which applies the water to the field at or greater than approximately five times the permeability factor of the soil.

5. The invention of claim 4, wherein said source includes a plurality of hoses, there being a hose for each slot respectively, each hose extending into general alignment with its corresponding slot, and wherein is included the step of installing a quantity of reinforcement material in the slots prior to releasing the water into the slots.

* * * * *